United States Patent [19]

Rosenberg

[11] 4,221,236
[45] Sep. 9, 1980

[54] STEPPABLE MECHANISM AND VALVES INCLUDING SAME

[76] Inventor: Peretz Rosenberg, Moshav Beit Shearim, Israel

[21] Appl. No.: 883,852

[22] Filed: Mar. 6, 1978

[30] Foreign Application Priority Data

Mar. 6, 1977 [IL] Israel .................................. 51597
Jan. 27, 1978 [IL] Israel .................................. 53907

[51] Int. Cl.³ ............................................. A01G 25/00
[52] U.S. Cl. ............................ 137/624.11; 251/230; 239/69; 74/25; 74/55; 74/88
[58] Field of Search ................. 137/624.11, 624.13, 137/624.15, 624.18, 624.2; 239/66, 69; 74/25, 55, 88; 251/230

[56] References Cited

U.S. PATENT DOCUMENTS

| | | | |
|---|---|---|---|
| 3,018,788 | 1/1962 | Perlis ........................ | 137/624.11 X |
| 3,154,147 | 10/1964 | Lanmon ..................... | 74/88 X |
| 3,853,145 | 12/1974 | Judd ........................... | 251/230 X |
| 3,869,928 | 3/1975 | Ishii ........................... | 74/88 |

Primary Examiner—Alan Cohan
Attorney, Agent, or Firm—Benjamin J. Barish

[57] ABSTRACT

A steppable mechanism is described comprising a cam member formed with a series of interconnecting cam slots symmetrically arranged in a closed loop around a central axis, and a follower pin movable within the slots to effect a rotary movement of the cam member in stepped increments in a predetermined forward direction. Each of the cam slots is of decreasing depth in the forward direction of rotation of the cam member such that at each juncture of one slot with the next, the end point of the slot traversed is higher than the starting point of the next slot in the forward direction to thereby define a shoulder between the two slots blocking the return movement of the pin in the traversed direction and constraining its movement only into the next slot in the forward direction of rotation.

Also described are valve constructions including the steppable mechanism for actuating the valve at a predetermined step thereof.

22 Claims, 11 Drawing Figures

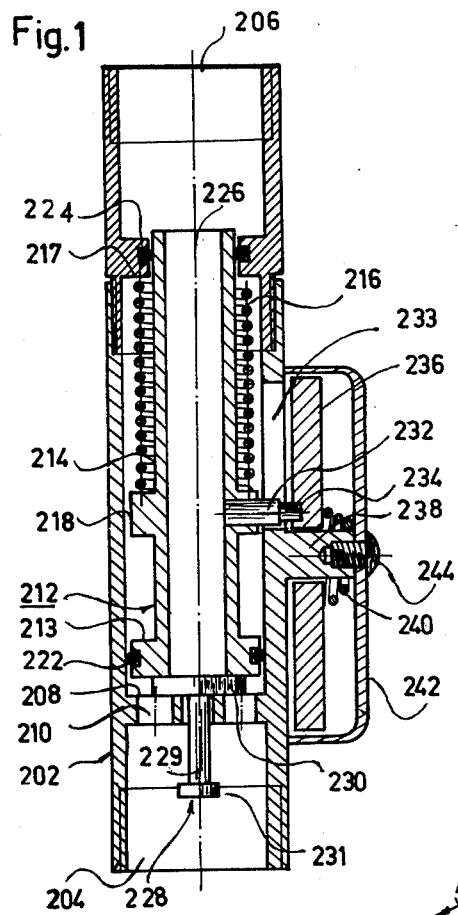
Fig. 1
Fig. 2a
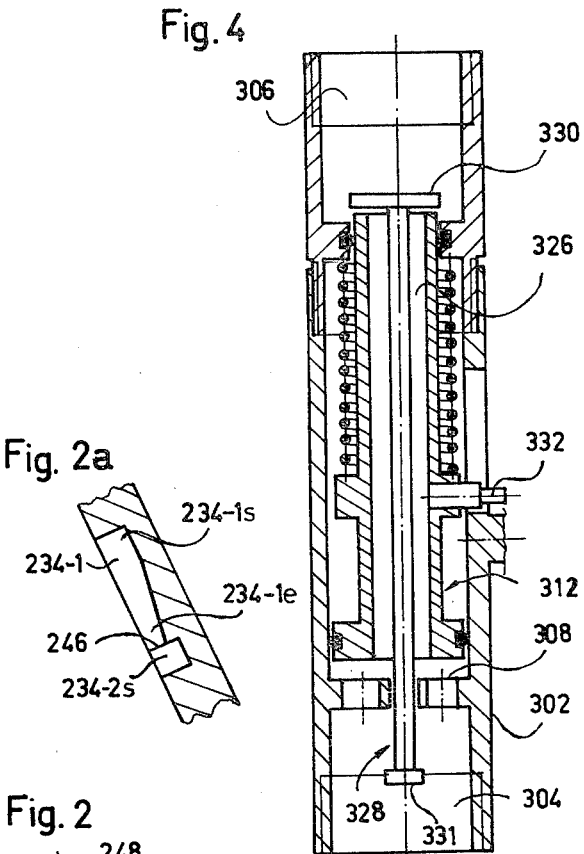
Fig. 4
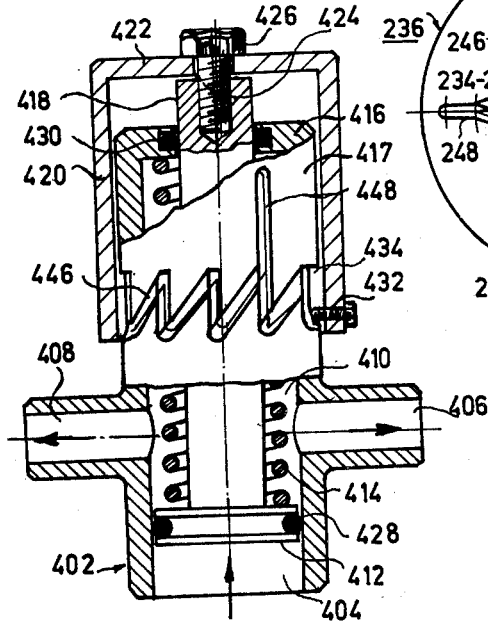
Fig. 5
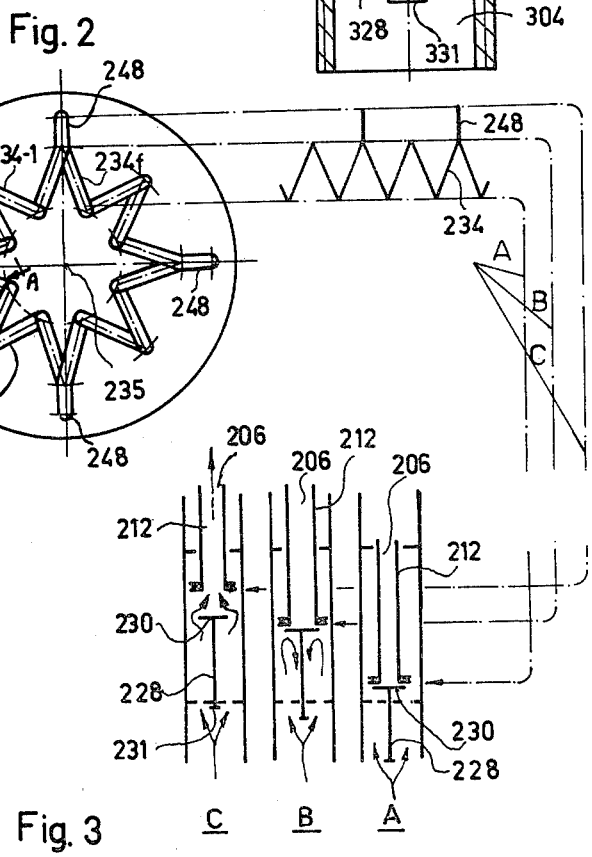
Fig. 2
Fig. 3

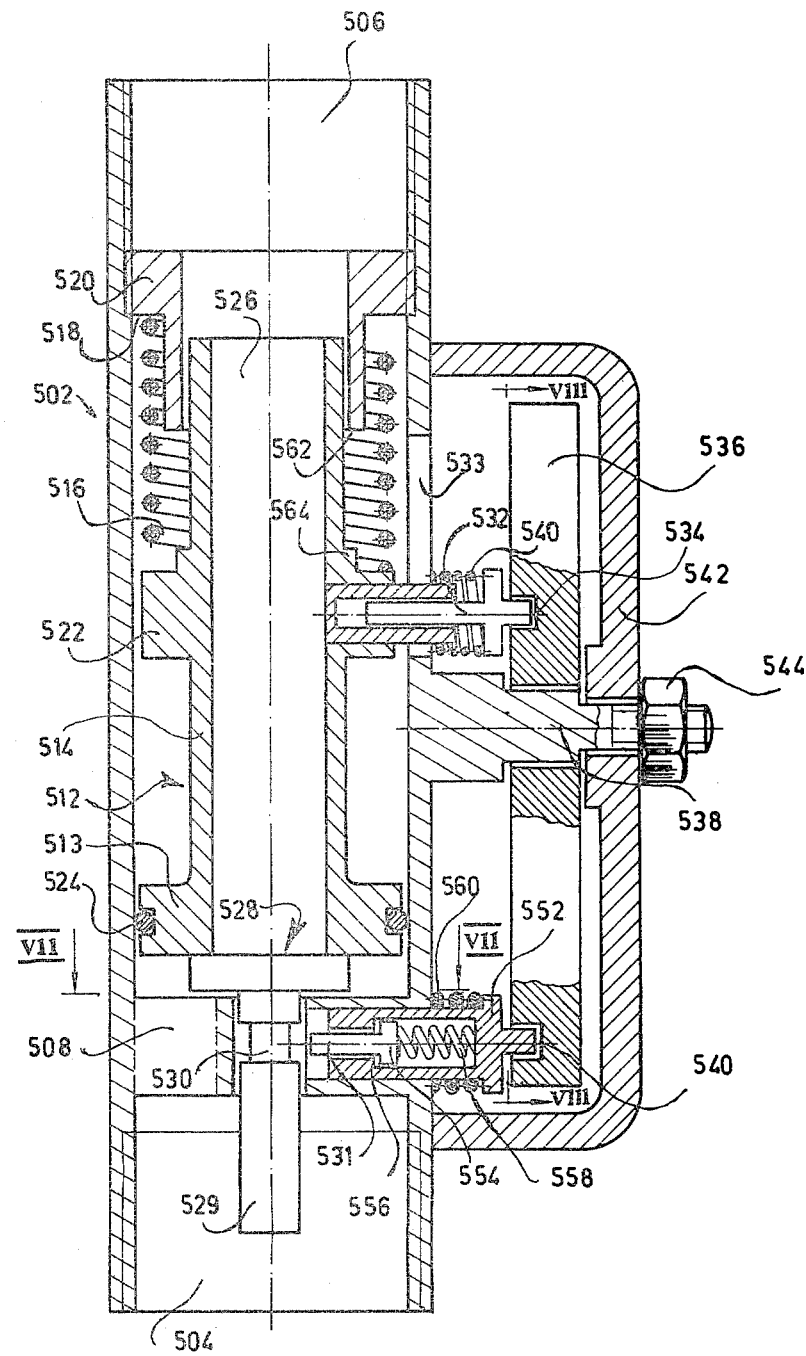
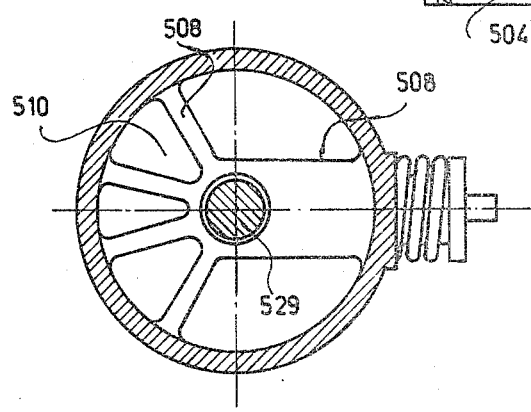
Fig.6
Fig.7

STEPPABLE MECHANISM AND VALVES INCLUDING SAME

BACKGROUND OF THE INVENTION

The present invention relates to steppable mechanisms and to valves including such mechanisms. The invention is particularly applicable in fluid distribution apparatus, such as water irrigation systems, for selectively controlling the operation of valves from a remote location.

Many types of steppable mechanisms have been devices including various arrangements for blocking the return movement of the stepping element and constraining its movement only in the forward direction. However, the known blocking arrangements are usually of relatively complicated construction requiring a number of extra elements.

The present invention relates to a steppable mechanism of extremely simple design. The invention is particularly useful in controlling valves but is also useful in other applications.

SUMMARY OF THE INVENTION

According to one aspect of the present invention, therefore, there is provided a stappable mechanism device comprising: a first member formed with a series of interconnecting cam slots symmetrically arranged in a closed loop around a central axis; a second member carrying a pin movable within said series of cam slots to effect a rotary movement in stepped increments of one member with respect to the other member around said central axis in a predetermined direction; and a spring causing said pin to seat against the bottom of the slots as it traverses each in succession; each of said cam slots being of decreasing depth in said predetermined direction of rotation such that at each juncture of one slot with the next; the end point of the slot traversed is higher than the starting point of the next slot in said predetermined direction of rotation, to thereby define a shoulder between the two slots blocking the return movement of the pin in the traversed slot and constraining its movement only into the next slot in said predetermined direction of rotation. At least one of the cam slots is formed with an extension at its junction with the next succeeding cam slot which extension is of the same depth as, and projects past, the starting point of the next succeeding slot thereby enabling the second member to move a longer stroke after stepping the first member a predetermined number of increments corresponding to the position of the cam slot with the extension.

Accordingly, the stappable mechanism can be used to permit one member, namely the second member mentioned above, to move a longer stroke and thereby to control another device, after the member has been reciprocated a predetermined number of times.

According to another aspect of the invention, there is provided a valve including the above steppable mechanism for actuating the valve at predetermined steps.

According to a further aspect of the invention, the device includes a stop effective, when actuated by the steppable mechanism, to limit the displacement of said valve member and thereby to disable same from controlling the fluid flowing through said passageway.

Further features of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view of a valve including one form of steppable mechanism constructed in accordance with the invention;

FIG. 2 is a side elevational view illustrating the steppable rotating disc in the device of FIG. 1;

FIG. 2a is an enlarged sectional view along lines A—A of FIG. 2 illustrating the configuration of one of the cam slots formed in the steppable rotating disc of FIG. 1;

FIG. 3 is a diagram helpful in understanding the control of the valve by the steppable mechanism of FIG. 2;

FIGS. 4 and 5 are longitudinal sectional views of two other types of valves constructed in accordance with the invention;

FIG. 6 is a transverse sectional view of another form of remotely-controllable valve constructed in accordance with the invention;

FIG. 7 is a sectional view along lines VIII—VIII of FIG. 6;

DESCRIPTION OF THE PREFERRED EMBODIMENTS

Figure 8:
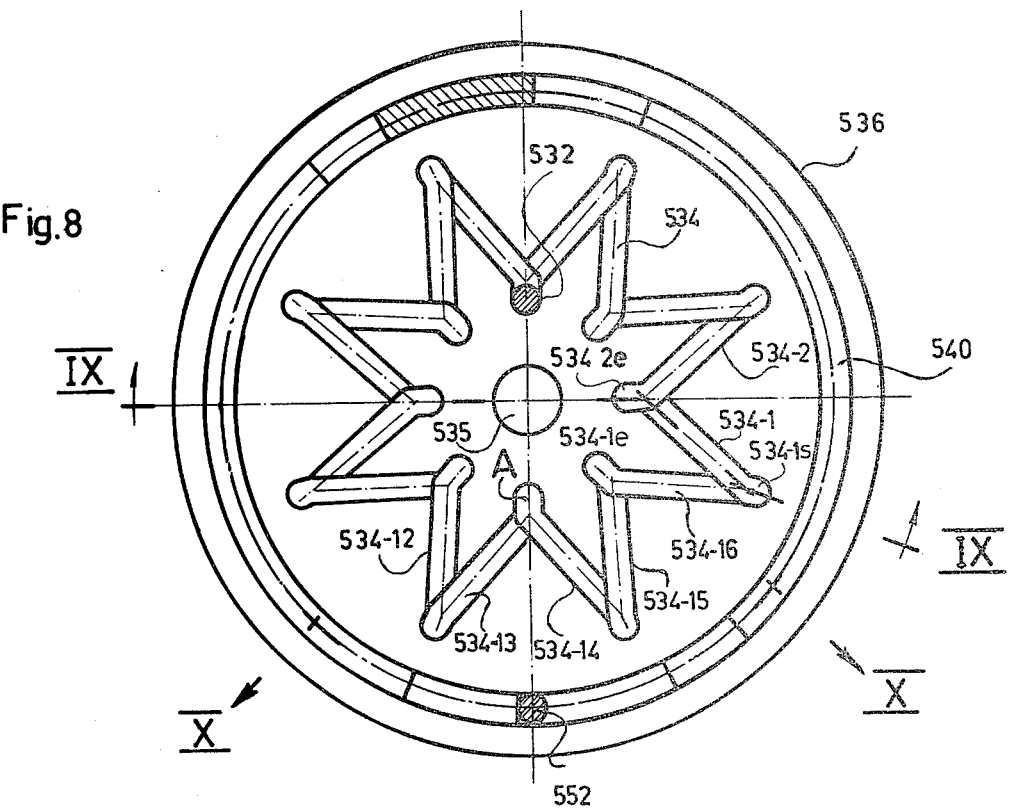
FIG. 8 is a sectional view along lines VIII—VIII of FIG. 6.
Figure 9:
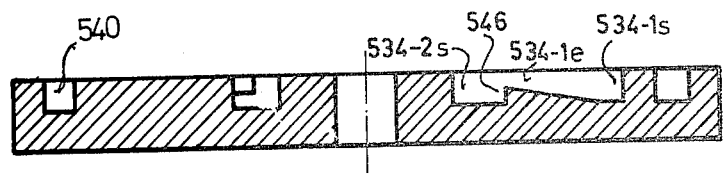
FIG. 9 is a sectional view along lines IX—IX of FIG. 8.

The valve illustrated in FIG. 1 is one which is normally closed but is automatically opened after pressurized fluid has been applied to the valve inlet a predetermined number of times. It includes a housing, generally designated 202, formed with an inlet 204, an outlet 206, and an apertured ring 208 integral with the housing and having openings 210 through which the pressurized fluid flows from the inlet to the outlet.

A piston 212 having a head 213 and a stem 214 is displaceable within the housing by the pressurized fluid applied to the housing inlet 204. A spring 216 is interposed between a shoulder 217 formed in the housing, and another shoulder 218 formed on piston stem 214. An O-ring 222 seals piston head 213 with respect to the inner surface of the housing, and a second O-ring 224 seals the outer end of the piston stem 214 with respect to the housing shoulder 217. A bore 226 is formed axially through the piston head 213 and stem 214.

A valve member, generally designated 228, includes a stem 229 displaceable within ring 208 in the housing inlet 4 to follow piston 212 as the piston is displaced within the housing by the pressurized fluid applied to the inlet. Valve member 228 further includes a head 230 disposed at the inlet end of the piston bore 226 and normally closing that end of the bore when the valve member follows the piston. However, the valve member further includes a stop 231 limiting against the sides of ring 208 so as to limit the displacement of head 230. When this occurs, the valve is permitted to open, as will be described more particularly below.

A pin 232 is secured to the piston stem 214 and moves within a slot 233 in the housing. Pin 232 cooperates with a series of cam slots, generally designated 234, formed on an end face of a steppable disc 236 rotatable about a cylindrical embossment 238 formed externally of the housing. Disc 236 is loosely mounted on embossment 238 and is biased inwardly towards pin 232 by a spring 240, so that the pin is caused always to seat against the bottom of the cam slot 234 in which it moves. A cover 242 is fixed to embossment 238 by a threaded fastener 244 to cover disc 236.

As shown particularly in FIG. 2, the cam slots 234 are arranged in a star-like circular array around the centre 235 of the disc 236. For purposes of example, the circular array of the cam slots in FIG. 2 defines an 8-pointed star, there being two cam slots for each point, or a total of sixteen such slots. As the pin 232 carried by piston 212 is reciprocated with the displacement of the piston by the pressurized fluid applied to the inlet 204 of the valve, the pin acts as a cam follower and moves along one cam slot 234 to step the disc 236 one increment, and when the supply of pressurized fluid to the inlet is terminated, spring 216 returns the piston 212 and the pin 232, causing same to move in the next cam slot to step disc 236 another increment.

The cam slots 234 are formed with a special construction to assure that disc 236 will be stepped in the same direction during the return movement of the pin 232, as in the forward movement of the pin. Thus, each of the cam slots 234 is of decreasing depth in the predetermined direction of rotation of the disc 236, such that at each juncture of one slot with the next, the end point of the slot traversed is higher than the starting point of the next slot in the direction of rotation of the disc. This is more clearly illustrated in FIG. 2a, wherein it will be seen that the starting point 234-1s of slot 234-1 is of greater depth than its end point 234-1e, the depth linearly decreasing towards the end point, such that a shoulder 246 is produced at the juncture of the end point 234-1e of that slot, with respect to the starting point 234-2s of the next slot 234-2. This shoulder 246 blocks the pin 232 from moving in the traversed slot during the return movement of the piston 212, and constrains the pin 232 to move only in the next slot 234-2 in the desired predetermined direction of rotation of the rotatable disc 236.

As also shown particularly in FIG. 2, the ending point of certain of the slots is provided with an extension 248 projecting past the other slots; FIG. 2 shows an extension 248 provided at every other juncture between slots. Each extension 248 is at the larger depth of the starting end of the next succeeding slot so that the shoulder 246 will also here, as described above, constrain the pin 232 to move from the extension 248 into the next succeeding slot during the next stroke of the piston 212.

Each of the slot extensions 248 permits the pin 232, and thereby the piston 212 to which the pin is secured, to move a longer reciprocating stroke than at the junctures of the other slots where such a slot extension is not provided. This longer reciprocation of the piston permits an external device to be actuated at the step of the rotatable disc 236 corresponding to the position where such slot extensions 248 are provided. In the arrangement of FIGS. 1-3, this slot extension 248 permits the valve to be opened at this step, whereas at all other times the valve is kept closed.

The device illustrated in FIGS. 1-4 operates as follows: When pressurized fluid is applied to the inlet 204 of housing 202, piston 212 is displaced away from the inlet (upwardly in FIG. 1), causing pin 232 to move along one of the cam slots 234 in the steppable disc 236 thereby stepping the disc one increment. In the arrangement illustrated in FIGS. 1 and 2, the pin 232 will move in this step through a forward stroke outwardly along the slot (e.g. 234f, FIG. 2) at the right of the disc centre, from the starting deep end of the slot to its shallow end, and will drop into the deep starting end of the next succeeding slot (e.g. 234r, FIG. 1). Thus, during the forward stroke of the piston 212 in the cycle being described, the pin 232 will move from the deeper starting end of the respective forward slot 34f outwardly along the slot, thereby rotating the steppable disc 236 in the clockwise direction as shown in FIG. 2. Shoulder 246, between the shallow end of the traversed forward slot 34f and the deep start of the next return slot 234r, prevents the pin from moving back along traversed slot 234f and constrains it to move only along the next slot 234r, thereby assuring the stepping of disc 236 in the clockwise direction with each reciprocation of pin 232 and piston 212.

FIG. 3 diagrammatically illustrates how the valve is normally maintained closed whenever piston 212 is limited in its displacement by pin 232 reaching the outer juncture of two slots, but is opened whenever the piston is permitted to be displaced for a longer distance by one of the slot extensions 248.

Thus, piston 212 is in its retracted position (condition A, FIG. 3) whenever there is no pressurized fluid applied to the inlet 204 of the valve housing 202. In this position of the piston, its passageway 226 is closed by valve member 230 of the follower 228.

When pressurized fluid is applied to the inlet 204 of the valve housing, the piston 212 is displaced away from the inlet by the pressurized fluid, but its displacement is limited by pin 232 limiting against the slots 234 formed in the rotatable disc 236, the latter disc being stepped an increment during each such reciprocation of the pin as described above. When there is no slot extension 248 at the particular stepped position of the disc 236, the outward displacement of piston 212 is limited such that the valve member 228 is able to follow it, and therefore to have its head 230 maintain closed the passageway 226 through the piston, as shown by condition B, FIG. 3.

However, as shown by condition C in FIG. 3, whenever the disc 236 is in such position that pin 232 is aligned with a slot extension 248, piston 212 is permitted to be displaced for a longer stroke by the pressurized fluid, such that stop 231 of the valve member 228 prevents its head 230 from following the piston, whereupon the inlet end of the bore 226 is open to the flow of pressurized fluid from inlet 204, through openings 210 and bore 226 in the piston 212, and out through outlet 206.

It will thus be seen that the valve illustrated in FIGS. 1-3 is normally maintained closed, but can be opened by applying pressurized fluid to the inlet 204 a predetermined number of times; in this case the valve is opened every other time in which pressurized fluid is applied.

FIG. 4 illustrates a variation wherein the valve is normally opened, but is closed by the application of pressurized fluid to its inlet 304 a predetermined number of times.

Thus, the valve in FIG. 4 includes a piston 312 which is displaceable within housing 302 with each application of pressurized fluid to the housing inlet 304. Each displacement of the piston actuates a stepping mechanism which is the same as described above with respect to FIGS. 1-3; for the sake of simplifying the drawing, only the pin 332 of the stepping mechanism is illustrated in FIG. 4. In the arrangement of FIG. 4, however, the valve member 328 includes a head 330 which is disposed at the outlet end of the piston bore 326, the valve member 328 further including a stop 331 which limits against a ring 308 at the inlet 304 of the valve housing.

Thus, whenever pressurized fluid is applied to the inlet 304 displacing piston 312, the fluid flowing through bore 326 also displaces valve member 328, whereupon its head 330 will uncover the outlet end of bore 306, permitting the fluid to flow from inlet 304 through outlet 306. Whenever, however, pin 332 moves along a slot having an extension (such as slot extension 248 in FIG. 2), the piston 312 will be permitted to be displaced a longer distance until the outlet end of its bore 326 limits against the inner face of valve member head 330 (the outward displacement of the valve member having been limited by its stop 331), whereupon the valve will be closed.

FIG. 5 illustrates the invention embodied in another form of valve having a housing 402 including an inlet 404 and two outlets 406 and 408, the latter being connected to the inlet by a passageway 410. A valve member in the form of a piston 412 is disposed within inlet 404 upstream of the outlets 406, 408, the piston being urged to the illustrated position by a spring 414 interposed between it and end wall 416 of the cylindrical housing section 417.

Piston 412 includes a stem 418 extending through an opening in the housing end wall 416 and is coupled to a cup-shaped member or sleeve 420 having an end wall 422. The coupling is effected by a threaded fastener 424 having a head 426, which fastener freely passes through an opening formed in end wall 422 and is threaded into the tip of the piston stem 418. Piston 412 is sealed with respect to the inner surface of the housing inlet by an O-ring 428, and a further O-ring 430 is provided in the housing end wall 416 opening through which stem 418 passes.

The side wall of the cup-shaped member or sleeve 420 fixedly carries a pin 432 projecting into the interior of the member. Pin 432 is a cam follower and has a spring-biassed tip which moves in cam slots 434 formed in the outer surface of the fixed housing section 417. It will be seen that when piston 412 is displaced upwardly by the pressurized fluid, it moves sleeve 420 with it, whereby pin 432 on the sleeve moves along the slots 434 to rotate the sleeve about fastener shank 424 in stepped increments with each reciprocation of the piston.

The construction of the slots 434 is the same as described above with respect to slots 234 in FIGS. 1–3. In the embodiment of FIG. 5, however, the slot-carring member, namely housing section 417, is fixed, and the member (namely sleeve 420) carrying the pin 432 is both reciprocated (by piston 412) and rotated in stepped increments about fastener shank 424 as the piston is reciprocated. As described above with respect to FIGS. 1–3, each slot 434 is of decreasing depth in the direction of rotation of sleeve 420, such that at each juncture of one slot with the next, the end point of the slot traversed is higher than the starting point of the next slot in the predetermined direction of rotation, thereby defining a shoulder 446 between them blocking the return movement of the pin 232 in the traversed slot and constraining its movement only to the next slot in the predetermined direction of rotation of sleeve 420.

In addition, at least one cam slot includes an extension 448 at its juncture with the next succeeding cam slot to enable the reciprocatable piston 412 to move a longer stroke when moving in the slot having the extension, than when moving in a slot not having such an extension. In FIG. 5 only one extension 448 is illustrated, it being appreciated that the depth of extension 448 is the same as, and projects past, the starting point of the next succeeding cam slot 434, so that the shoulder 446 will force the pin to move in the next succeeding cam slot during the next reciprocating stroke of the pin 412, as described above.

It will thus be seen that during each reciprocation of the piston 412 by the application of pressurized fluid applied to its inlet 404, the displacement (upward movement) of the piston will normally be limited by the cam slot 434 in which the pin 432 is movable, to prevent the piston 412 from being displaced a sufficient distance to open the passageway between inlet 404 and outlets 406, 408. However, when there is an extension 448 at the end of the cam slot in which the pin 432 is moving, the pin, and thereby the piston 412, will be permitted to move for a longer stroke until the piston clears the outlets 406, 408, thereby opening the valve to the passage of the pressurized fluid from its inlet 404 to the outlets.

FIGS. 6–10 illustrate another valve similar to that of FIG. 1, which is also normally closed but is automatically opened after pressurized fluid has been applied to the valve inlet a predetermined number of times. The valve of FIGS. 6–10 includes a housing, generally designated 502, formed with an inlet 504, an outlet 506, and a spider ring 508 fixed within the housing and having openings 510 (FIG. 7) through which the pressurized fluid flows from the inlet to the outlet when the valve is open.

A piston 512 having a head 513 and a stem 514 is displaceable within the housing by the pressurized fluid applied to the housing inlet 504. A spring 516 is interposed between a shoulder 518 formed in a collar 520 threaded within the housing, and another shoulder 522 formed on piston stem 514. An O-ring 524 seals piston head 513 with respect to the inner surface of the housing. A bore 526 is formed axially through the piston head 513 and stem 514.

A valve member 528 includes a stem 529 displaceable within ring 508 in the housing inlet 504 to follow piston 512 as the piston is displaced by the pressurized fluid applied to the inlet. Valve member 528, disposed at the inlet end of the piston bore 526, normally closes that end of the bore when the valve member follows the piston. However, its stem 529 is formed with an annular recess 530 in which a stop 531 is adapted to be seated at preselected times to limit the displacement of the valve member 528. When this occurs, the valve is caused to open, as will be described more particularly below.

A pin 532 is carried by the piston stem 514 and moves within a slot 533 in the housing. Pin 532 cooperates with a series of cam slots, generally designated 534, formed on the inner face of a steppable disc 536 rotatable about a cylindrical embossment 538 formed in the housing. Pin 232 is biassed by a spring 540 to seat against the bottom of the cam slot 534 in which it moves. A cover 542 is fixed to embossment 538 by a threaded fastener 544 to enclose disc 536.

As shown particularly in FIG. 8, the cam slots 534 are arranged in a star-like circular array around the centre 535 of the disc 536. For purposes of example, the circular array of the cam slots in FIG. 8 defines an 8-pointed star, there being two cam slots for each point, or a total of sixteen such cam slots, numbered 534-1 to 534-16. As the pin 532 carried by piston 512 is reciprocated with the displacement of the piston by the pressurized fluid applied to the inlet 504 of the valve, the pin moves along one cam slot 534 to step the disc 536 one increment, and when the supply of pressurized fluid to the inlet is terminated, spring 516 returns the piston 512 and the pin 532, causing the pin to move in the next cam slot to step disc 536 another increment.

The cam slots 534 are formed of the same construction as described above to assure that disc 536 will be stepped in the same direction during the return movement of the pin 532 as in the forward movement of the pin. Thus, each of the cam slots 534 is of decreasing depth in the predetermined direction of rotation of the disc 536, such that at each juncture of one slot with the next, the end point of the slot traversed is higher than the starting point of the next slot in the direction of rotation of the disc. This is more clearly seen in the right-hand portion of FIG. 9, wherein it will be seen that, assuming the disc 536 is to rotate in the clockwise direction, the starting point 534-1s of slot 534-1 is of greater depth than its end point 534-1e, the depth linearly decreasing towards the end point, such that a shoulder 546 is produced at the juncture of the end point 534-1e of that slot with respect to the starting point 534-2s of the next slot 534-2. This shoulder 546 blocks the pin 532 from returning in the just-traversed slot during the return movement of the piston 512, and constrains the pin 532 to move only in the next slot 534-2 in the desired predetermined clockwise direction of rotation of the rotatable disc 536.

The rotatable disc 536 of the stepping mechanism is provided, on the same end face as the star-shaped array of cam slots 534, with a second cam surface in the form of a circular slot 540 circumscribing the star-shaped array of slots 534. The circular cam slot 540 receives the reduced-diameter end of a pin 552 (see FIG. 6) carrying within it the previously-mentioned stop 531 which cooperates with the valve stem 529. Stop 531 is received within a bore formed in pin 552, the stop being formed with an enlarged head 554 continuously pressed against an annular shoulder 556 of the pin by a spring 558. Pin 552 is in turn urged to seat in the bottom of slot 540 by another spring 560 interposed between the valve housing 502 and an annular shoulder formed at the end of pin 552.

Figure 10:
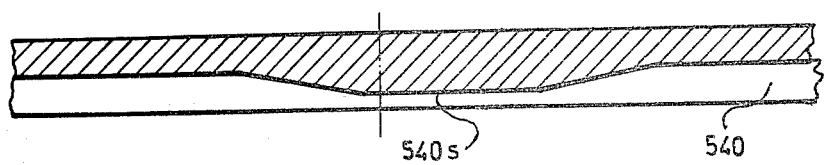
FIG. 10 is a sectional view along lines X—X of FIG. 8.

As shown particularly in FIG. 10, which is a section along lines X—X of FIG. 8, the circular slot 540 is formed with a depth variation, in this case a high point 540s, at each location thereof corresponding to the predetermined step number of the disc 536 at which stop 531 is to be actuated to seat within the annular recess 530 and thereby to limit the displacement of the valve member 528. In the example illustrated in FIGS. 8 and 10, this high point 540s in slot 540 starts at the beginning of slot 534-13, reaches its peak at the end of the latter slot, maintains its peak throughout slot 534-14 to the beginning of slot 534-15, and then gradually returns to its normal depth.

It will thus be seen that pin 552, being urged by spring 560 to move along the bottom of slot 540, will begin to project itself towards the annular recess 530 when pin 532 is seated at the beginning of slot 534-13, the projection being completed when pin 532 has completed the traverse through slot 534-13. At that instant, indicated at "A" in FIG. 8, the pin 532 carried by piston 512 will be in the retracted position illustrated in FIG. 6 wherein the annular recess 530 formed in stem 529 of the valve member 520 will be substantially aligned with stop 531 carried by pin 552. Accordingly, spring 558 will urge stop 531 into the annular recess 530, thereby holding the valve member 520 against displacement as the piston 512 is driven to its extended (highermost) position by the fluid pressure allied to the inlet 504 of the valve. Valve member 528 will thus be restrained from following the piston, thereby opening the valve for the flow of the pressurized fluid from inlet 504 through bore 526 and outlet 506.

The operation of the valve illustrated in the drawings will be apparent from the above description. Thus, whenever the pressurized fluid is applied to the inlet 504, piston 512 will be driven upwardly by the pressurized fluid, causing its pin 532 to move along the cam slot 534 in which it is seated, thereby stepping the disc 536 one step, in this case 1-16th of a rotation of the disc. Normally, pin 552 is seated in a deep part of the circular slot 540 so that stop 531 is in its retracted position, i.e., withdrawn from the annular recess 530 formed in stem 529 of the valve member 528. Accordingly, the valve member 528 will follow the upward movement of piston 512, thereby keeping the inlet end of bore 526 closed. As soon as the application of pressurized fluid to inlet 504 is terminated, spring 516 returns the piston 512 to its retracted position (the position illustrated in FIG. 1) with the valve member 528 still closing the inlet end of bore 526. This return movement of the piston causes its pin 532 to traverse the next slot 534 of disc 536, thereby stepping the disc 536 another increment.

The foregoing action is repeated with each application and release of pressurized fluid to the valve inlet 504, the disc 530 being stepped 2-16th of a revolution with each such application and release of the pressurized fluid, and the inlet end of bore 526 being retained closed by the valve member 528.

Now, when disc 536 has been stepped to the beginning of a high point 540s in the circular slot 540, which occurs for example at the beginning of slot 534-13 as described above and as illustrated in FIG. 8, the high point 540s of slot 540 will start to project pin 552 towards the annular recess 530 in the valve stem 529. The projection will be completed at the end of that step, which is at the instant the piston 512 and the valve member 528 are in their fully retracted positions as illustrated in FIG. 6. At this instant, stop 531 will seat within the annular recess 530, thereby preventing the valve member 528 from being displaced with piston 512 the next time pressurized fluid is applied to the valve inlet 504. Accordingly, when the pressurized fluid is applied to the inlet the next time, piston 512 will be reciprocated as described above, but valve member 528 will be held against following the piston, whereby the valve member will uncover the inlet end of bore 526, permitting the pressurized fluid to flow from inlet 504 through opening 508, bore 526, and outlet 505.

The reciprocations of the piston 512 by the pressurized fluid are limited by the sturdy valve housing itself, i.e. by the end 562 of collar 520 fixed within the valve housing 502 engaging shoulder 564 formed on the piston stem 514, and not by the more fragile stepping mechanism including disc 536 and pin 532. Accordingly, the stepping mechanism is relieved of the large forces that might be applied to it by the pressurized fluid, thereby extending its useful life and enabling it to be made of simple and inexpensive materials, such as plastic.

Stop 531, which is carried by pin 552 and is actuated whenever the latter pin encounters a high point 540s in the circular cam slot 540, is biassed by spring 558 towards the recess 530 so that it will be able to snap into the recess when the latter is exactly aligned with the stop which, as mentioned above, will be at the retracted position of the valve member 528 and of the piston 512.

FIGS. 6-10 illustrate the invention embodied in an arrangement similar to that of FIG. 1 wherein the valve member 528 is disposed at the inlet side of the piston 512 and is normally displaced to close its axial passageway 526 by the inlet fluid pressure, the displacement of the valve member being limited by the stop 531 when actuated to open the passageway; in such an arrangement, valve member 528 follows the piston with each application of fluidized pressure, thereby maintaining the valve closed until the predetermined step number has been reached whereupon the valve is opened by stop 531 limiting the displacement of the valve member. It will be appreciated, however, that the invention can also be used in an arrangement such as illustrated in FIG. 4, wherein the valve member is disposed at the outlet side of the piston and is normally displaced to open its axial passageway by the inlet fluid pressure, the displacement of the valve member being limited by the stop when actuated to close the passageway; in such an arrangement, the valve will normally be opened with each new application of pressurized fluid, but will automatically be closed upon reaching the predetermined step number corresponding to the high point 540s of the circular cam slot 540.

Further variations, modifications, and applications of the invention will be apparent.

What is claimed is:

1. A steppable mechanism device, conprising: a first member formed with a series of interconnecting cam slots arranged in a closed loop around a central axis; a second member carrying a pin movable within said series of cam slots and reciprocatable with respect to the first member to effect a rotary movement in stepped increments of one member with respect to the other member around said central axis in a predetermined direction; said first member being a disc rotatable about an axis passing through its centre, said series of interconnecting cam slots being arranged in a star-shaped circular array around its centre axis, said second member being reciprocable to cause said pin carried thereby to effect the rotary movement of said disc in stepped increments; and a spring causing said pin to seat against the bottom of the slots as it traverses each in succession; each of said cam slots being of decreasing depth in said predetermined direction of rotation such that at each juncture of one slot with the next, the end point of the slot traversed is higher than the starting point of the next slot in said predetermined direction of rotation, to thereby define a shoulder between the two slots blocking the return movement of the pin in the traversed slot and constraining its movement only into the next slot in said predetermined direction of rotation: at least one of said cam slots being formed with an extension at its juncture with the next succeeding cam slot which extension is of the same depth as, and projects past, the starting point of the next succeeding slot thereby enabling said second member to move a longer stroke after stepping said first member a predetermined number of increments.

2. A device according to claim 1, wherein said first member is a fixed sleeve and said second member is both reciprocatably and rotatably mounted such that the reciprocation of said second member by the movement of said pin in the interconnecting slots of said fixed sleeve effects the rotary movement of said second member in stepped increments.

3. A device according to claim 1, in combination with a valve actuated at a predetermined step of the steppable mechanism.

4. A device according to claim 3, wherein said valve comprises a housing having an inlet and an outlet for pressurized fluid; a piston, constituting said second member of the steppable mechanism and carrying said pin, reciprocatable within the housing by each application of pressurized fluid to its inlet, said piston having an axial bore extending therethrough constituting a passageway connecting the housing inlet to the housing outlet; and a valve member disposed within the housing adjacent to one end of said piston and displaceable with respect thereto by the fluid pressure applied to the housing inlet so as to control the fluid flowing through said passageway at said predetermined step of the steppable mechanism.

5. A device according to claim 4, further including a stop effective, when actuated by the steppable mechanism, to limit the displacement of said valve member and thereby to disable same from controlling the fluid flowing through said passageway.

6. A device according to claim 5, wherein said first member of the steppable mechanism is a rotatable disc formed with said interconnecting slots defining a first cam surface engageable by said pin defining a first cam follower carried by said piston for stepping the disc during each reciprocation of the piston, said rotatable disc being formed with a second cam surface engageable by a second cam follower for actuating said stop at each predetermined step number of the disc, to cause the stop to limit the displacement of the valve member.

7. A device according to claim 6, wherein said second cam surface of the rotatable disc comprises a circular slot formed on an end face of the disc around its axis of rotation, said circular slot having a depth variation at each location thereof corresponding to the predetermined step number of the disc at which said stop is to be actuated to limit the displacement of the valve member.

8. A device according to claim 7, wherein said valve member is formed with a recess, and said stop comprises a pin carried by said second cam follower and moved thereby into said recess at each of said depth variations of the circular slot engaged by the second cam follower.

9. A device according to claim 8, wherein said valve member includes a stem, said recess being an annular groove formed in said stem, the device further including a spring interposed between the second cam follower and said stop for urging the latter towards said annular recess at each of said depth variations engaged by said second cam follower.

10. A device according to claim 5, wherein said housing includes a limit engageable by said piston for limiting its displacement during each reciprocation thereof.

11. A device according to claim 5, wherein said valve member is disposed at the inlet side of the piston and is normally displaced to close its axial passageway by the inlet fluid pressure, said displacement of the valve member being limited by the stop, when actuated, to open said passageway.

12. A device according to claim 5, wherein said valve member is disposed at the outlet side of the piston and is normally displaced to open its axial passageway by the inlet fluid pressure, said displacement of the valve member being limited by the stop, when actuated, to close said passageway.

13. A remotely-controllable valve, comprising: a housing having an inlet and an outlet for pressurized fluid; a piston reciprocatable within the housing by each application of pressurized fluid to its inlet, and having an axial bore extending therethrough constituting a passageway connecting the housing inlet to the housing outlet; a valve member disposed within the housing adjacent to one end of said piston and displaceable with respect thereto by the fluid pressure applied to the housing inlet so as to control the fluid flowing through said passageway; a stop effective, when actuated, to limit the displacement of the valve member and thereby to disable same from controlling the fluid flowing through said passageway; and a steppable mechanism stepped during each reciprocation of said piston and including means effective, at a predetermined step number, to actuate said stop to cause same to limit the displacement of the valve member and thereby to disable same from controlling the fluid flowing through said passageway.

14. A valve according to claim 13, wherein said steppable mechanism comprises a rotatable disc formed with a first cam surface engageable by a first cam follower carried by said piston for stepping the disc during each reciprocation of the piston, and a second cam surface engageable by a second cam follower for actuating said stop at each predetermined step number of the disc, to cause the stop to limit the displacement of the value member.

15. A valve according to claim 14, wherein said second cam surface of the rotatable disc comprises a circular slot formed on a face of the disc about its axis of rotation, said slot having a depth variation at each location thereof corresponding to the predetermined step number of the disc at which said stop is to be actuated to limit the displacement of the valve member.

16. A valve according to claim 15, wherein said valve member is formed with a recess, and said stop comprises a pin carried by said second cam follower and moved thereby into said recess at each of said depth variations of the circular slot engaged by the second cam follower.

17. A valve according to claim 16, wherein said valve member includes a stem, said recess being an annular groove formed in said stem, the valve further including a spring interposed between the second cam follower and said stop for urging the latter towards said annular recess at each of said depth variations engaged by said second cam follower.

18. A valve according to claim 14, wherein said first cam surface of the disc comprises a series of interconnecting cam slots formed in said face of the rotatable disc and arranged in a star-shaped circular array around its axis of rotation; said first cam follower comprising a pin carried by the piston and reciprocated therewith for stepping the disc an increment of rotation with each reciprocation of the piston.

19. A valve according to claim 18, further including a spring for urging said first cam follower pin to seat in the bottom of said series of interconnected cam slots as it traverses each in succession causing the disc to be stepped in a predetermined direction of rotation; each of said cam slots being of decreasing depth in said predetermined direction of rotation such that at each juncture of one slot with the next, the end point of the slot traversed is higher than the starting point of the next slot in said predetermined direction of rotation, thereby defining a shoulder between the two slots blocking the return movement of the first cam follower pin in the traversed slot and constraining its movement only into the next slot in said predetermined direction of rotation.

20. A valve according to claim 18, wherein said housing includes a limit engageable by said piston for limiting its displacement during each reciprocation thereof.

21. A valve according to claim 13, wherein said valve member is disposed at the inlet side of the piston and is normally displaced to close its axial passageway by the inlet fluid pressure, said displacement of the valve member being limited by the stop, when actuated, to open said passageway.

22. A valve according to claim 13, wherein said valve member is disposed at the outlet side of the piston and is normally displaced to open its axial passageway by the inlet fluid pressure, said displacement of the valve member being limited by the stop, when actuated, to close said passageway.

* * * * *